(No Model.) 3 Sheets—Sheet 1.

C. E. WHITAKER.
SOAP MOLDING MACHINE.

No. 313,564. Patented Mar. 10, 1885.

WITNESSES
Henry Marsh
John F. C. Prescott

INVENTOR
Clarence E. Whitaker
by Crosby & Gregory
attys.

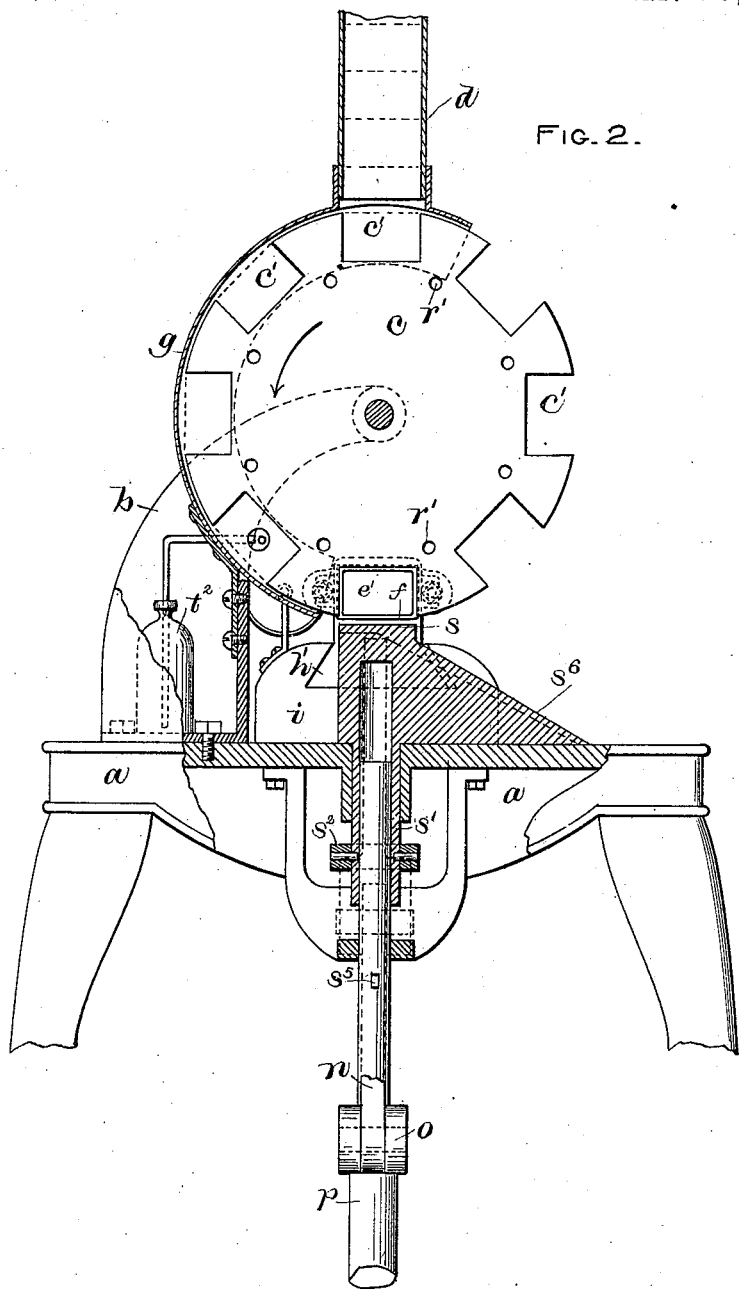

(No Model.)  3 Sheets—Sheet 3.

C. E. WHITAKER.
SOAP MOLDING MACHINE.

No. 313,564. Patented Mar. 10, 1885.

WITNESSES
Henry Mauls
John F. C. Pinckert

INVENTOR
Clarence E. Whitaker
by Crosby & Gregory
att'ys

UNITED STATES PATENT OFFICE.

CLARENCE E. WHITAKER, OF HYDE PARK, MASSACHUSETTS.

SOAP-MOLDING MACHINE.

SPECIFICATION forming part of Letters Patent No. 313,564, dated March 10, 1885.

Application filed May 12, 1884. (No model.)

*To all whom it may concern:*

Be it known that I, CLARENCE E. WHITAKER, of Hyde Park, county of Norfolk, State of Massachusetts, have invented an Improvement in Soap-Molding Machines, of which the following description, in connection with the accompanying drawings, is a specification, like letters on the drawings representing like parts.

My invention has for its object to produce an organized machine for molding cakes of soap or similar material. As heretofore practiced, the pieces of soap that have set in definite shape, but are not compacted or hardened, are placed by an operator one at a time between the dies or parts of a mold, in which the said pieces are compressed into hard cakes of definite shape, having any desired character or design embossed upon the surface. The dies have been forced together by power, and the pieces to be molded fed thereto and removed from the dies when the latter are separated by hand.

The present invention is embodied in a machine containing feed mechanism, whereby the pieces to be molded are automatically conveyed one at a time to the position to be acted upon by the dies, which are then automatically forced against the said piece, molding it into a cake, are then separated, and the cake automatically detached therefrom and removed to make way for the next piece, which is then fed into position by the feeding apparatus.

The machine also contains devices for spraying the surfaces of the pieces of soap just before they are acted upon by the dies, so as to prevent the material from sticking to the said dies.

In previous machines one die has been stationary, and an important feature in the present machine consists in making both dies movable toward one another.

Figure 1:
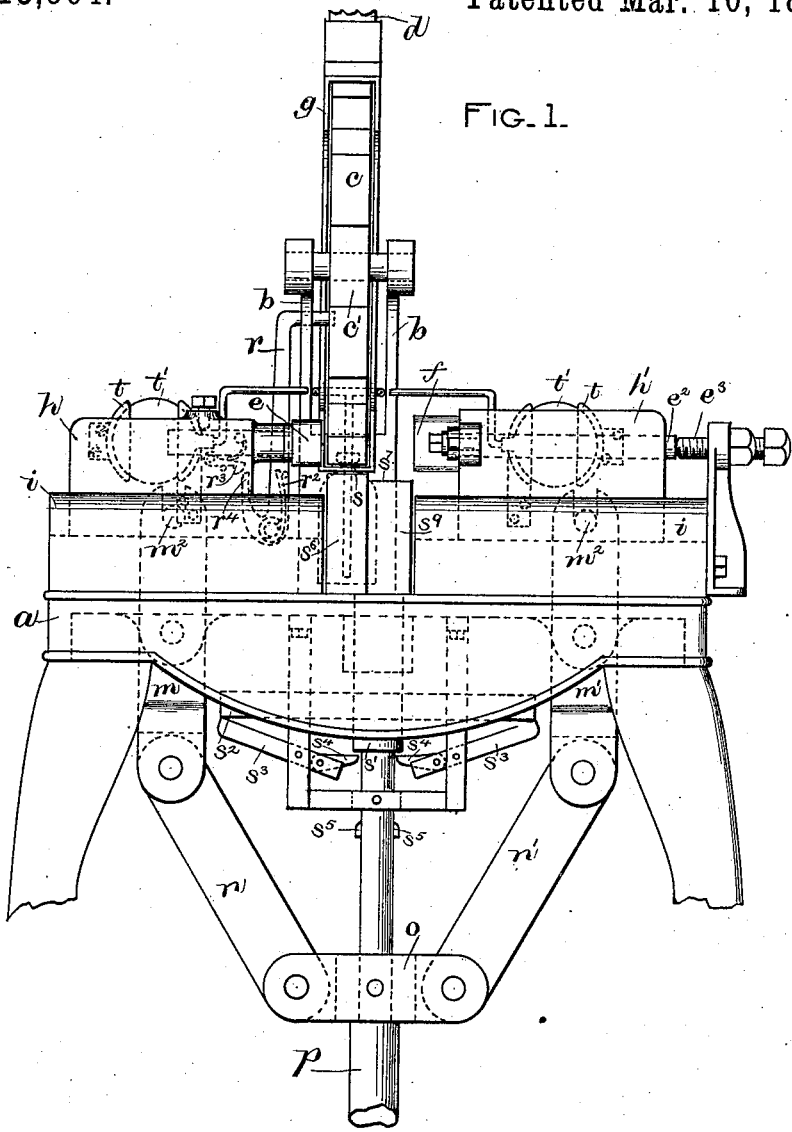
Figure 4:
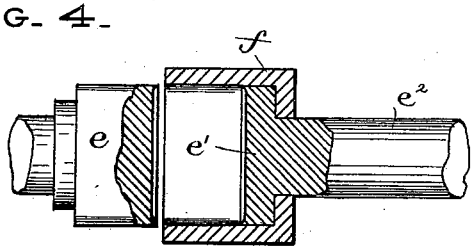
Figure 3:
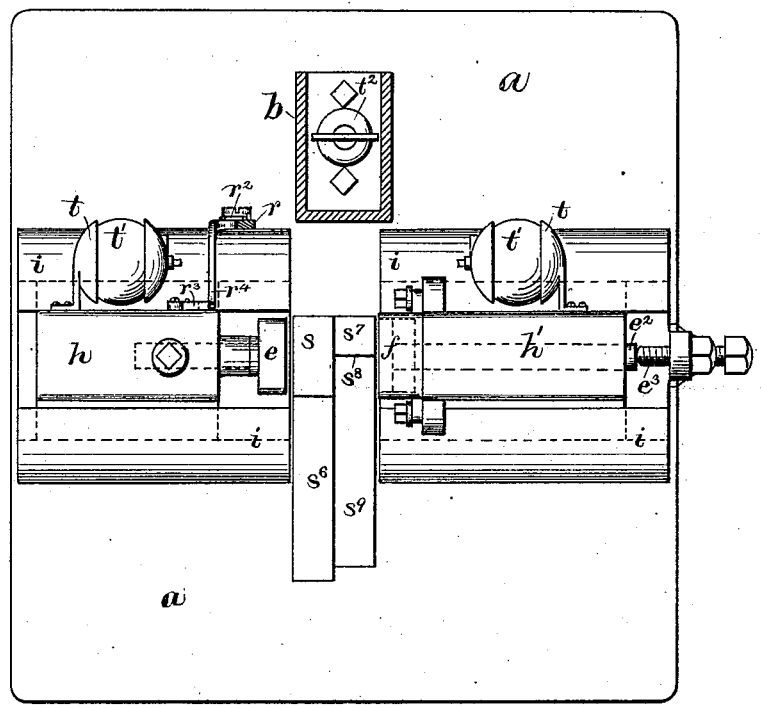

Figure 1 is a front elevation of a machine for molding soap, embodying this invention; Fig. 2, a vertical section thereof; Fig. 3, a horizontal section below the feed mechanism, showing the dies and co-operating parts in plan; Fig. 4, a detail of the dies, and Fig. 5 a detail to be referred to.

Figure 5:
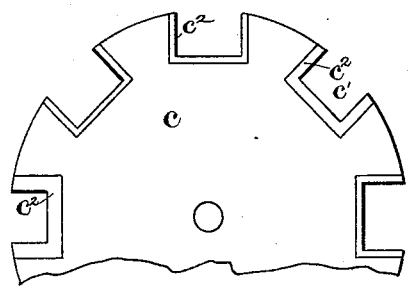

The operating parts of the machine are supported on frame-work $a$, having the general appearance of a table, it being provided with a bracket or upright, $b$, supporting the feeding device or carrier $c$, consisting of a wheel or disk provided with a series of pockets or recesses in its periphery to receive the pieces to be molded. The said feeding device or carrier has a rotary movement, controlled as hereinafter described, by which the said pieces are conveyed from a chute or hopper, $d$, to a position between the dies $e$ $e'$, the latter of which is movable in a box, $f$, which confines the edges of the piece of soap being molded, the said box $f$, with the die $e'$, forming the female portion of the molding devices. The pieces to be molded are retained in a column in the chute $d$, and the lowermost piece drops, under the action of gravity, into one of the recesses, $c'$, of the feeding device $c$, when the said recesses come beneath the said column, and when the said device makes its next feeding movement it carries the piece that is thus placed in the recess $c'$ forward, the column of pieces being then supported on the periphery of the feeding device between the recesses until the next recess comes beneath the said column, when the lowermost piece drops into it, as before. The sides of the recesses in the feeding device $c$ are open or uncovered to permit the entrance of the dies, and it will be seen, referring to Fig. 2, that the recesses at one side only of the feeding device contain the pieces to be molded, the weight of which will be sufficient to produce the rotary movement of the feeding device in the direction of the arrow thereon, so that it will only be necessary to limit or arrest the said movement during a sufficient time for the dies to act, and then to release the feeding device when the dies are separated, permitting it to turn until again arrested. The portion of the periphery of the feeding device that is provided with pieces to be molded is inclosed in a shield or cover, $g$, preventing the pieces from dropping out of the said recesses. The dies $e$ $e'$ are mounted upon carriages $h$ $h'$, having a sliding movement in guides $i$ upon the main frame-work or table $a$, the said carriages being actuated by levers $m$ $m'$, connected by links $n$ $n'$ with a cross-head, $o$, fixed upon a longitudinally-movable rod, $p$, which may be actuated with a reciprocating movement by any suitable means—such as a cam, crank, or treadle, or by means of a piston connected directly with the said rod and operating in a cylinder by fluid-pressure in any usual manner. The die-actuating devices $m$ $m'$ $n$ $n'$ $o$ have the character of a toggle-lever, and produce great pressure on the dies when the latter are closed nearly together and the links $n$ $n'$ and cross-piece $o$ are nearly in line. The levers $m$ $m'$ are shown as forked, to embrace studs or pins $m^2$ on the die-carriages $h$ $h'$. The die $e'$ has a longitudinal movement relative to its carriage in the box $f$, which latter is fixed upon the said carriage, the said die $e'$ being provided with a stem, $e^2$, engaged by a stop or projection, $e^3$, in the outward movement of the die-carriage, thus arresting the said die $e'$ in the latter part of the said movement, causing it to travel through the box $f$, to eject the compressed cake therefrom in case the latter remained in the box when the dies were separated. The feeding device $c$ is arrested in the proper position to present the pieces of soap to the dies by means of a stopping device, $r$, shown as a finger adapted to enter one of a series of holes, $r'$, in the said feeding device $c$, the said finger being normally pressed toward the face of the said feeding device by a spring, $r^2$. The stop $r$ is disengaged from the feeding device to permit the latter to move when the dies are separated by means of a releasing device or catch, $r^3$, in the die-carriage $h$, engaging a projection, $r^4$, on the said stop, and removing its end from the hole $r'$ in which it has been resting, thus permitting the feeding device or carrier $c$ to turn under the weight of the pieces of soap in the recesses at one side of its periphery, as before described. In the further movement of the die-carriage the projection $r^4$ is disengaged, permitting the stop $r$ to be again pressed against the face of the carrier $c$, so that it will drop into the next one of the holes $r'$ to again stop the carrier which comes to rest with one of the recesses $c'$ over a bed, $s$, which supports the piece until the dies act upon it. The said bed $s$ is connected with a tubular shaft, $s'$, surrounding the upper portion of the shaft $p$, and provided at its lower end with a cross-bar, $s^2$, resting on pivoted levers $s^3$, provided with engaging pawls or fingers $s^4$. The rod $p$ is provided with projections $s^5$, which, in the upward movement of the said rod, by which the dies are forced together, as before described, pass the projection $s^4$ of the levers $s^3$, and thereafter in the downward movement of the said rod engage the said fingers $s^4$, moving the levers $s^3$ and causing them in acting on the cross-piece $s^2$ to raise the bed $s$ just after the dies $e$ $e'$ have been separated far enough to clear the edge of the said bed. Thus in case the molded cake sticks to the die $e$ the bed $s$ in rising will detach it from the said die, causing it to drop upon the bed $s$, when the carrier $c$ in its next feeding movement will push the cake off from the said bed, causing it to slide down the incline $s^6$, where it may fall into a suitable receptacle or may remain until removed. In case, however, the cake should remain in the box $f$ when the dies begin to separate it, will be ejected therefrom by the die $e'$, as before described, and if it adheres to the face of the said die, it will be struck by the portion $s^7$ of the movable table, which is inclined from a point, $s^8$, about beneath the middle of the cake, so that the said cake will immediately slide down the incline $s^9$ without any further action on the part of the feeding mechanism. The said table and its actuating devices thus constitute the cake detaching and discharging mechanism. The pieces supplied in quantities in the chute $d$ are thus rapidly conveyed one at a time to the molds, compressed thereby, and discharged therefrom, one being completed at each upward and downward movement of the actuating-rod $p$. The die-carriages $h$ $h'$ are provided with pressing devices $t$, which act upon flexible bulbs $t'$, each forming a part of an atomizer or spraying device by which liquid is raised from the receptacle $t^2$ and delivered in the form of a spray upon the sides of the piece that will be presented to the dies at the next movement of the carriage $c$, the shield $g$ being provided with openings to receive the said spray, which is composed of a material of proper nature to prevent adhesion between the soap and dies. The recesses $c'$ in the carrier will be of sufficient size to take the largest pieces of material that are ever to be molded by the machine; and, when it is desired to mold smaller pieces or make smaller cakes, the said recesses may be provided with boxes or lining-pieces $c^2$, as shown in Fig. 5, and new dies of proper size connected with the die-carriages.

It is obvious that the connecting mechanism between the various parts may be modified without departing from the invention, which consists, essentially, in the various devices for feeding, molding, and discharging the material, together with actuating mechanism whereby the different devices are caused to operate at the proper times with relation to one another. By making both dies move simultaneously in opposite directions they strike a blow upon the soap as is necessary to mold it properly; but the effect of the shock is neutralized or counterbalanced, so that but very little jar is transmitted to the machine or building in which it is operating.

I claim—

1. In a soap-molding machine, the combination of the following elements, namely: the molding-dies for shaping the cakes singly, a feeding device or carrier operating to present the pieces to be molded one at a time to the said molding-dies, and actuating mechanism for the said dies, substantially as described.

2. The rotary feeding device or carrier having recesses in its periphery, combined with the dies and actuating mechanism therefor, and devices controlling the movement of the carrier, substantially as described.

3. The feeding device or carrier and dies, combined with the spraying devices and actuating mechanism, substantially as described, 4. The feeding device and dies combined with the detaching and discharging devices and actuating mechanism, substantially as described.

5. The feeding device or carrier consisting of a wheel or disk provided with recesses which receive the pieces to be molded, combined with the shield inclosing a portion of the periphery of the said carrier, the bed upon which the pieces are supported, and the dies and actuating mechanism, substantially as described.

6. The feeding device or carrier having recesses in its periphery, and adapted to be rotated by the weight of the material in the said recesses, combined with the dies and a stopping device for the said carrier, substantially as described.

7. The feeding device consisting of a disk or wheel having recesses in its periphery, combined with the movable bed below the said feeding device, and the dies and actuating mechanism whereby the dies are moved toward one another and then separated, and the bed raised after the dies are separated, substantially as described.

8. The feeding device or carrier consisting of a disk or wheel having recesses in its periphery, combined with the bed below the said carrier, the dies movable laterally toward and from the said carrier, the spring-pressed stopping device for the said carrier, and disengaging device therefor connected with one of the said dies, and operated to release the carrier in the movement of the die away therefrom, substantially as described.

9. The feeding device or carrier combined with the dies and their supporting-carriages, movable in guides toward and from one another, one of the said carriages being provided with a box, and the corresponding die being movable therein, and a stopping device for arresting the said die in the movement of the carriage in which the dies are separated, substantially as described.

10. The feeding device or carrier and the movable bed, combined with the dies and their supporting-carriages, movable toward and from one another, the actuating-rod and connecting devices between it and the said dies and bed, whereby the dies are moved together and separated and the bed moved to detach a molded cake from the said separated dies, substantially as described.

11. The feeding device and dies movable toward and from one another, combined with the bed for supporting the piece to be molded by the dies, the said bed having inclined portions for discharging the molded cake, substantially as described.

12. The carrier or feeding device having recesses in its periphery, combined with detachable boxes for the said recesses, enabling pieces of material of different sizes to be fed thereby, and the dies and actuating mechanism therefor, whereby the said pieces are molded, substantially as described.

13. In a machine for molding soap, a bed to support the piece to be molded, combined with the dies $e\ e'$ and actuating mechanism, substantially as described, whereby the said dies are moved toward each other to simultaneously strike with a blow the piece to be molded, as and for the purposes set forth.

In testimony whereof I have signed my name to this specification in the presence of two subscribing witnesses.

CLARENCE E. WHITAKER.

Witnesses:
   Jos. P. Livermore,
   B. J. Noyes.